United States Patent
Jiang et al.

(10) Patent No.: US 11,077,496 B2
(45) Date of Patent: Aug. 3, 2021

(54) MICROWAVE-ASSISTED CARBON TEMPLATE METHOD FOR PREPARING SUPPORTED NANO METAL MATERIALS

(71) Applicants: WUHAN INSTITUTE OF TECHNOLOGY, Wuhan (CN); CHANGZHOU UNIVERSITY, Changzhou (CN)

(72) Inventors: Xingmao Jiang, Wuhan (CN); Jingyuan Cao, Changzhou (CN); Xue Tong, Changzhou (CN); Zhongnan Zhang, Changzhou (CN); Jian Feng, Changzhou (CN)

(73) Assignees: WUHAN INSTITUTE OF TECHNOLOGY, Wuhan (CN); CHANGZHOU UNIVERSITY, Changzhou (CN)

( * ) Notice: Subject to any disclaimer, the term of this patent is extended or adjusted under 35 U.S.C. 154(b) by 185 days.

(21) Appl. No.: 16/279,926

(22) Filed: Feb. 19, 2019

(65) Prior Publication Data
US 2019/0176231 A1   Jun. 13, 2019

Related U.S. Application Data

(63) Continuation of application No. PCT/CN2017/104429, filed on Sep. 29, 2017.

(30) Foreign Application Priority Data

Oct. 8, 2016 (CN) .......................... 201610876607.5

(51) Int. Cl.
  *B22F 9/22*    (2006.01)
  *C04B 35/626*  (2006.01)
  (Continued)

(52) U.S. Cl.
  CPC .............. *B22F 1/0018* (2013.01); *B22F 9/22* (2013.01); *B22F 9/24* (2013.01); *B82Y 30/00* (2013.01);
  (Continued)

(58) Field of Classification Search
  None
  See application file for complete search history.

(56) References Cited

U.S. PATENT DOCUMENTS

| 6,891,324 | B2 | 5/2005 | Dorfman |
| 2003/0051580 | A1* | 3/2003 | Lewis ...................... C01G 3/02 75/362 |

(Continued)

FOREIGN PATENT DOCUMENTS

| CN | 101288849 A | * | 10/2008 |
| CN | 101485978 A | | 7/2009 |

(Continued)

OTHER PUBLICATIONS

English Translation of CN 101288849 (originally published Oct. 2008) from Espacenet.*

(Continued)

*Primary Examiner* — George Wyszomierski
(74) *Attorney, Agent, or Firm* — Anova Law Group, PLLC

(57) ABSTRACT

The present disclosure provides a microwave-assisted carbon template method for preparing supported nano metal-oxides or nano metals. The method includes mixing a carbohydrate, urea, and a precursor of an oxide support with a metal salt in a container, adding a certain amount of water, and completely dissolving the solid chemicals through ultrasonic stirring to form a homogeneous solution. The method also includes performing microwave treatment on the obtained solution for approximately 0.1 minute to 60 min-
(Continued)

utes with a microwave heating power in a range of approximately 100 W to 50 kW to dehydrate and carbonize the carbohydrate and thus form a dark brown solid. The method further includes performing heat treatment on the dark brown solid at a temperature in a range of approximately 200° C. to 1100° C. in an air atmosphere for approximately 0.5 hour to 24 hours to obtain a metal-oxide supported by a porous oxide support.

11 Claims, 5 Drawing Sheets

(51) Int. Cl.
  *B22F 1/00* (2006.01)
  *B22F 9/24* (2006.01)
  *B82Y 30/00* (2011.01)
  *B82Y 40/00* (2011.01)
  *C04B 35/628* (2006.01)
  *C08L 5/00* (2006.01)
  *C08L 1/08* (2006.01)
  *C08L 3/02* (2006.01)

(52) U.S. Cl.
  CPC .......... *B82Y 40/00* (2013.01); *C04B 35/6267* (2013.01); *C04B 35/6286* (2013.01); *C04B 35/62805* (2013.01); *B22F 2201/01* (2013.01); *B22F 2202/11* (2013.01); *B22F 2301/15* (2013.01); *B22F 2999/00* (2013.01); *C04B 2235/3227* (2013.01); *C04B 2235/3229* (2013.01); *C04B 2235/3418* (2013.01); *C08L 1/08* (2013.01); *C08L 3/02* (2013.01); *C08L 5/00* (2013.01)

(56) References Cited

U.S. PATENT DOCUMENTS

2011/0313059 A1* 12/2011 Blosi ................... B01J 13/0043
  516/97
2013/0206665 A1* 8/2013 Wyndham ............ B01J 20/3257
  210/198.2

FOREIGN PATENT DOCUMENTS

CN  101767018 A  7/2010
CN  106475571 A  3/2017

OTHER PUBLICATIONS

English Translation of CN 106475571 (originally published Mar. 2017) from Espacenet.*
The World Intellectual Property Organization (WIPO) International Search Report for PCT/CN2017/104429 dated Dec. 28, 2017 4 Pages.
Dacheng Hu et al., Enhanced Investigation of CO Methanation over Ni/Al2O3 Catalysts for Synthetic Natural Gas Production, I & EC research, 2012, p. 4875-4886, ACS.
Hui Wang et al., Preparation of CuO nanoparticles by microwave irradiation, Journal of Crystal Growth, 2002, p. 84-94, NH Elsevier.
Ana M. Peiro et al., Titanium(IV) oxide thin films obtained by a two-step soft-solution method, Thin Solid Films, 2002, p. 185-191, Elsevier.

* cited by examiner

MICROWAVE-ASSISTED CARBON TEMPLATE METHOD FOR PREPARING SUPPORTED NANO METAL MATERIALS

This application is a continuation application of International Application No. PCT/CN2017/104429, filed on Sep. 29, 2017, which claims the priority and benefits of Chinese Patent Application Serial No. CN201610876607.5, filed with the State Intellectual Property Office of P. R. China on Oct. 8, 2016, the entire content of all of which is incorporated herein by reference.

FIELD OF THE INVENTION

The present disclosure provides a microwave-assisted carbon template method for preparing supported nano metal-oxides or nano metals, and belongs to the field of nano material preparation technology.

BACKGROUND

Nano materials are solid materials composed of very fine grains with feature dimensions on the order of nanometers (about 100 nm). Nano materials have many properties that are not available in conventional materials, including optical properties, electromagnetic properties, thermodynamic properties, and quantum mechanical properties. Due to these properties, nano materials are widely used in the fields of lubrication, optoelectronics, magnetic recording, catalysis, etc. However, due to the high surface energy, nanoparticles are easy to spontaneously agglomerate, which greatly limits the nano-effect of nano materials and reduces their application fields and effects. Therefore, nano materials often require a support. A porous material is a material composed of interconnected or closed voids. For example, porous silicon oxide and alumina are ideal catalyst supports, which may not only be able to block the agglomeration of the supported particles and provide transport channels for the reaction solution, but also can promote the diffusion of the material generated. The large specific surface area of the porous material facilitates the contact between catalyst and reactant. Therefore, the porous material is one of the indispensable important materials in the modern industry. The preparation of porous oxide supports is generally carried out by a hard template method and a soft template method, which are considered to be the most efficient methods for the synthesis of porous materials. Materials of supported nano metals or nano oxides have broad application prospects in many fields, such as industrial catalysis, water treatment, electrochemistry, etc.

In terms of preparing a porous-materials-supported nano metal or a nano metal-oxide, a direct impregnation method is generally employed. The direct impregnation method is to directly immerse a porous oxide support material in a metal salt solution, and following drying and heating treatment, a nano material supported by a porous oxide support may then be obtained. Although the impregnation method is widely used, the method may not be able to effectively adjust the particle size, the composition, and the distribution in the support.

A microwave-assisted carbon template method utilizes high-frequency microwave energy to generate a large amount of heat in a short time, thereby promoting various chemical reactions, and it is a more effective method for energy utilization and heating. Synthesis through microwave heating can greatly accelerate the movement and collision speed of reactive molecules, which is beneficial to the formation of a large number of crystal nuclei. In addition, the synthesis through microwave heating can limit the increase of crystal grain size, and also synthesize nano materials that are smaller and more uniform than the crystals prepared by the conventional methods. At present, the microwave synthesis technology has been widely used for the preparation of nano materials.

As such, conventional methods for synthesizing porous-oxide-supported nano metals or nano metal-oxides often have problems such as difficulty in controlling the size of nanoparticles, poor dispersion, high cost of template agents, severe post-treatment pollution, etc. Moreover, the conventional synthesis methods cannot be widely used for the preparation of various nano metals or oxides due to the limitations of the preparation methods. Therefore, developing a simple and universal method for preparing porous-oxide-supported nano metals or metal-oxides, which is capable of controlling the pore structure of the support and various parameters of the nanoparticles during the synthesis process, including the particle size, the composition, the crystal phase, the supporting capacity, etc., will certainly play a significant role in promoting the application of these nano materials.

BRIEF SUMMARY OF THE INVENTION

The object of the present disclosure is to develop a simple and universal method for preparing porous-oxide-supported nano metal-oxides or nano metals, which can be widely applicable to the synthesis of supported nano metals or nano metal-oxides.

According to the present disclosure, a carbohydrate, urea, and a precursor of an oxide support together with a metal salt are used to form a homogeneous water solution such that the metal salt is uniformly distributed in the liquid mixture (e.g. solution). Then, the carbohydrate is carbonized through microwave heating to obtain an oxide support and a nano metal coated with carbon. Therefore, metal active components are uniformly distributed in the porous carbon. After subsequent treatment at high temperature in air, a nano metal-oxide supported by an oxide support is obtained. Next, after high-temperature heat treatment in a reducing atmosphere, a porous-carbon supported nano metal-oxide or nano metal is obtained.

A microwave-assisted carbon template method for preparing a supported nano metal-oxide or nano metal according to the present disclosure includes the following exemplary steps:

a) a carbohydrate, urea, and a precursor of an oxide support together with a metal salt are mixed in a container, a certain amount of water is added, and a homogeneous solution is then formed by dissolving the mixed solid through ultrasonic stirring;

b) the solution obtained in step a) is subjected to microwave treatment for approximately 0.1 minute to 60 minutes with a microwave heating power in a range of approximately 100 W to 50 kW, such that the carbohydrate is dehydrated and carbonized to form a dark brown solid;

c) the dark brown solid obtained in step b) is subjected to heat treatment at a temperature in a range of approximately 200° C. to 1100° C. in an air atmosphere for approximately 0.5 hour to 24 hours to obtain an oxide material of a porous supported nano metal;

d) the solid obtained in step c) is subjected to heat treatment at a temperature in a range of approximately 200°

C. to 1100° C. in a reducing atmosphere for approximately 0.5 hour to 24 hours to obtain a porous oxide-supported nano metal/alloy.

The precursor of the oxide support used in step a) includes a common silicon source, a common aluminum source, or other common metal salt. Among them, the common silicon source includes at least one of silica sol, sodium silicate, and tetraethyl orthosilicate; the common aluminum source includes at least one of aluminum sol, aluminum sulfate, aluminum chloride, aluminum nitrate, and aluminum isopropoxide; the other common metal salt is a nitrate, halide, hypochlorite, acetate, oxalate, phosphate, or sulfate of a metal element, or includes more than one salt of different metal elements. The metal elements include: Mg, Pb, In, Sn, Sb, Zr, Nb, La, Ce, Ta, Mo, W, Re, Ti, V, Cr, Mn, Fe, Co, Ni, Cu, Zn, Ag, Pt, Pd, Ir, Ru, Rh, Y, Ba, Sr, La, and Os.

The metal salt used in step a) is a nitrate, halide, hypochlorite, acetate, oxalate, phosphate, or sulfate of a metal element, or includes more than one salt of different metal elements. The metal elements include: Mg, Al, Pb, In, Sn, Sb, Zr, Nb, La, Ce, Ta, Mo, W, Re, Ti, V, Cr, Mn, Fe, Co, Ni, Cu, Zn, Ag, Pt, Pd, Ir, Ru, Rh, Y, Ba, Sr, La, and Os.

The carbohydrate used in step a) is one of glucose, fructose, sucrose, maltose, lactose, starch and dextrin.

The mass ratio of the carbohydrate to urea in step a) is approximately 20:1 to 1:60.

The mass ratio of the carbohydrate to the metal salt in step a) is approximately 100:1 to 1:10.

The mass ratio of the carbohydrate to the precursor of the oxide support in step a) is approximately 100:1 to 1:50.

The mass ratio of the carbohydrate to water in step a) is approximately 50:1 to 1:100.

The oxide of the porous oxide support obtained in step c) is a single element oxide or a composite oxide. The single element oxide is an oxide of Si, Mg, Al, Pb, In, Sn, Sb, Zr, Nb, La, Ce, Ta, Mo, W, Re, Ti, V, Cr, Mn, Fe, Co, Ni, Cu, Zn, Ag, Pt, Pd, Ir, Ru, Rh, Y, Ba, Sr, La, or Os. The composite oxide includes oxides of two or more different elements of Si, Mg, Al, Pb, In, Sn, Sb, Zr, Nb, La, Ce, Ta, Mo, W, Re, Ti, V, Cr, Mn, Fe, Co, Ni, Cu, Zn, Ag, Pt, Pd, Ir, Ru, Rh, Y, Ba, Sr, La, and Os.

The nano metal-oxide supported by the porous oxide support obtained in step c) is a single metal element oxide or a composite metal-oxide. The single metal-oxide is an oxide of Mg, Al, Pb, In, Sn, Sb, Zr, Nb, La, Ce, Ta, Mo, W, Re, Ti, V, Cr, Mn, Fe, Co, Ni, Cu, Zn, Ag, Pt, Pd, Ir, Ru, Rh, Y, Ba, Sr, La or Os. The composite metal-oxide includes oxides of two or more different metal elements of Mg, Al, Pb, In, Sn, Sb, Zr, Nb, La, Ce, Ta, Mo, W, Re, Ti, V, Cr, Mn, Fe, Co, Ni, Cu, Zn, Ag, Pt, Pd, Ir, Ru, Rh, Y, Ba, Sr, La and Os.

The oxide of the porous oxide support obtained in step d) is a single element oxide or a composite oxide. The single element oxide is an oxide of Si, Mg, Al, Pb, In, Sn, Sb, Zr, Nb, La, Ce, Ta, Mo, W, Re, Ti, V, Cr, Mn, Fe, Co, Ni, Cu, Zn, Ag, Pt, Pd, Ir, Ru, Rh, Y, Ba, Sr, La or Os. The composite oxide includes oxides of two or more different elements of Si, Mg, Al, Pb, In, Sn, Sb, Zr, Nb, La, Ce, Ta, Mo, W, Re, Ti, V, Cr, Mn, Fe, Co, Ni, Cu, Zn, Ag, Pt, Pd, Ir, Ru, Rh, Y, Ba, Sr, La and Os.

The nano metal supported by the porous oxide support obtained in step d) is an elementary metal of Mg, Al, Sc, Ti, V, Cr, Mn, Fe, Co, Ni, Cu, Zn, Nb, Mo, Pt, Pd, Ru, Os, Rh, Ir, Au, Ag, Pb, In, Sn, Sb, Zr, Nb, La, Ce, Ta, Mo, W, or Re, or an alloy or an intermetallic compound of two or more different metal elements. The metal elements include Mg, Al, Sc, Ti, V, Cr, Mn, Fe, Co, Ni, Cu, Zn, Nb, Mo, Pt, Pd, Ru, Os, Rh, Ir, Au, Ag, Pb, In, Sn, Sb, Zr, Nb, La, Ce, Ta, Mo, W, and Re.

The reducing gas described in step d) is a mixed gas containing hydrogen or carbon monoxide in a volume fraction of approximately 5% to 10%, and nitrogen or argon as the equilibrium gas.

According to the present disclosure, a carbohydrate, urea, a precursor of an oxide support together with a metal salt are used to form a homogeneous water solution such that the metal salt is uniformly distributed in the liquid mixture (e.g. solution). Then, through in-situ synthesis, the carbohydrate is dehydrated and carbonized at high temperature, and the metal components are uniformly distributed in the carbon template. Finally, a nano metal supported by an oxide support is obtained through high-temperature heat treatment. The disclosed method can be used for supporting various nano metal materials. With a particle size in a range of approximately 2 nm to 1000 nm, the nano metal materials demonstrate high monodispersity. By adjusting the synthesis conditions, the composition, the crystal phase, and the supporting capacity of the nano metal can be controlled. In addition, the pore size of the support can also be controlled by raw material ratio, microwave heating power, time, etc., and the distribution of the pore size is a range of approximately 0.1 nm to 10 μm. Moreover, the disclosed method demonstrates various advantages including simple synthesis route, low cost, etc., and thus has broad application prospects in many fields, such as industrial catalysis, water treatment, electrochemistry, etc.

BRIEF DESCRIPTION OF THE DRAWINGS

In order to more clearly illustrate the technical solutions of the embodiments of the present disclosure, the drawings used for illustrating the embodiments will be briefly described below. It should be understood that the following drawings merely illustrate some embodiments of the present disclosure. For those of ordinary skill in the art, other drawings can be obtained according to these drawings without any creative work.

DETAILED DESCRIPTION

The present disclosure will be further described below with reference to various embodiments. It should be noted that the disclosed method can be implemented in various forms and should not be construed as limited to the embodiments of the present disclosure.

The present disclosure provides a microwave-assisted carbon template method for preparing supported nano metal-oxides or nano metals. The method includes mixing a carbohydrate, urea, and a precursor of an oxide support with a metal salt in a container, adding a certain amount of water, and completely dissolving the solid chemicals through ultrasonic stirring to form a homogeneous solution. The method also includes performing microwave treatment on the obtained solution for approximately 0.1 minute to 60 minutes with a microwave heating power in a range of approximately 100 W to 50 kW to dehydrate and carbonize the carbohydrate and thus form a dark brown solid. The method further includes performing heat treatment on the dark brown solid at a temperature in a range of approximately 200° C. to 1100° C. in an air atmosphere for approximately 0.5 hour to 24 hours to obtain a metal-oxide supported by a porous oxide support.

Embodiment 1

Silicon Oxide-Supported Nano Ni

Raw materials for synthesis include: glucose, urea, silica sol, water, and $Ni(NO_3)_2 \cdot 6H_2O$ (nickel nitrate).

The preparation process may include the following exemplary steps.

(1) 1.5 g of glucose, 2.5 g of urea, 2 g of silica sol, 5 g of water, and 0.9 g of $Ni(NO_3)_2 \cdot 6H_2O$ may be weighted and placed in a 100 mL beaker, and then ultrasonic stirring may be performed for approximately 10 minutes such that the chemicals in the beaker are dissolved.

(2) The liquid solution obtained in (1) may be taken out and heated in microwave with a heating power of 800 W. A dark brown bulky solid may be obtained after 3 minutes of heating.

(3) The sample obtained in (2) may be ground in a mortar and placed in a crucible. After baking in air at 500° C. for 5 hours, a silicon oxide-supported nano nickel-oxide may be obtained.

(4) The silicon oxide-supported nano nickel-oxide may be subjected to heat treatment at 550° C. and under a 5% $H_2/N_2$ condition (e.g., a reduction gas containing 5% $H_2$ and 95% $N_2$) for 4 hours to obtain a silicon oxide-supported nano nickel. An XRD test shows that the size of the Ni particles is about 5 nm.

Figure 1:
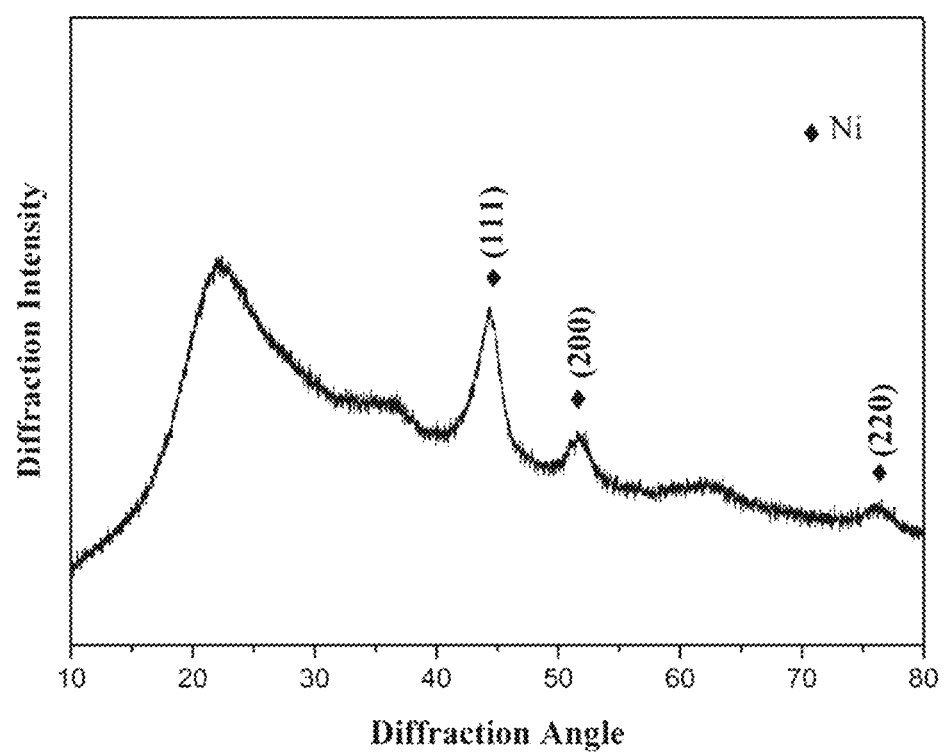
FIG. 1 illustrates an XRD pattern of a silicon oxide-supported metal Ni obtained in Embodiment 1.
Figure 5:
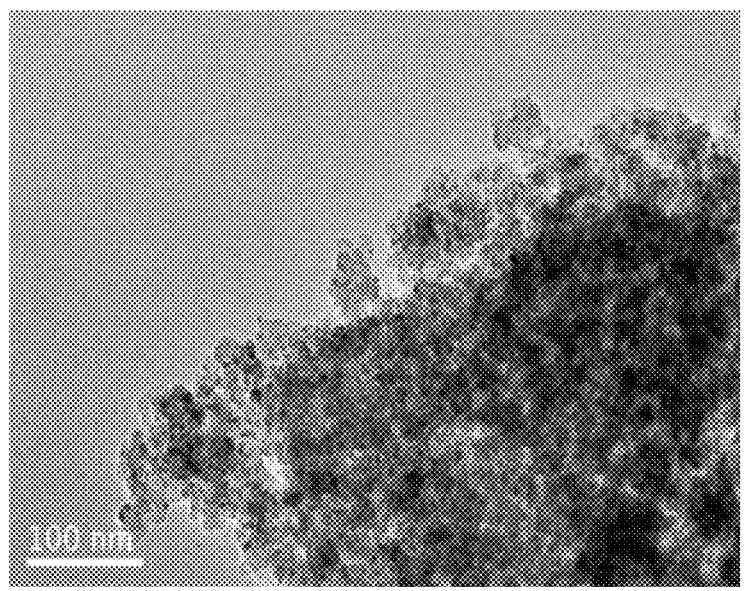
FIG. 5 illustrates a transmission electron microscopy (TEM) image of a silicon oxide-supported metal Ni obtained in Embodiment 1.

FIG. 1 shows an XRD pattern of a silicon oxide-supported metal Ni. Referring to FIG. 1, the Ni nano particles are uniformly distributed in the carbon support. FIG. 5 shows a TEM image of the silicon oxide-supported Ni. The TEM image proves that the particle size of the nano Ni is consistent with the XRD result.

Embodiment 2

Alumina-Supported Nano Ni

Raw materials for synthesis include: glucose, urea, aluminum sol, water, and $Ni(NO_3)_2 \cdot 6H_2O$ (nickel nitrate).

The preparation process may include the following exemplary steps.

(1) 1.5 g of glucose, 2.5 g of urea, 1 g of aluminum sol, 5 g of water, and 0.9 g of $Ni(NO_3)_2 \cdot 6H_2O$ may be weighted and placed in a 100 mL beaker, and then ultrasonic stirring may be performed for 10 minutes such that the chemicals in the beaker are dissolved.

(2) The liquid solution described in (1) may be taken out and heated in microwave with a heating power of 700 W. A dark brown bulky solid may be obtained after 10 minutes of heating.

(3) The sample obtained in (2) may be ground in a mortar and placed in a crucible. After baking in air at 500° C. for 5 hours, an alumina-supported nano nickel-oxide may be obtained.

(4) The alumina-supported nano nickel-oxide may be subjected to heat treatment at 650° C. and under a 5% $H_2/N_2$ condition (e.g., a reduction gas containing 5% $H_2$ and 95% $N_2$) for 4 hours to obtain an alumina-supported nano nickel. An XRD test shows that the size of the Ni particles is about 10 nm.

Figure 2:
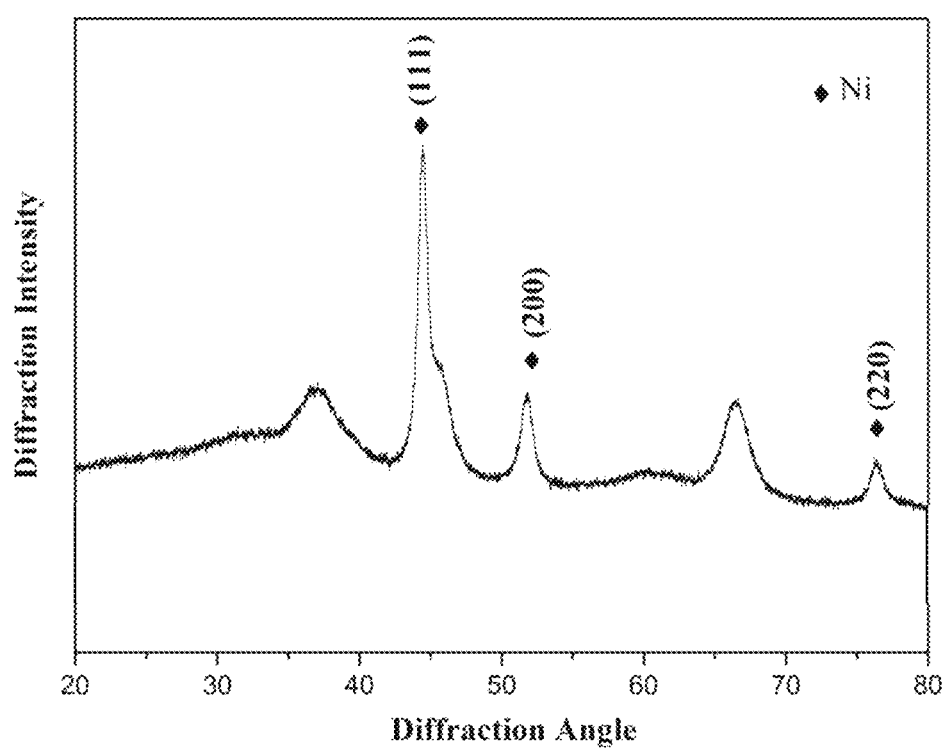
FIG. 2 illustrates an XRD pattern of an alumina-supported metal Ni obtained in Embodiment 2.
Figure 6:
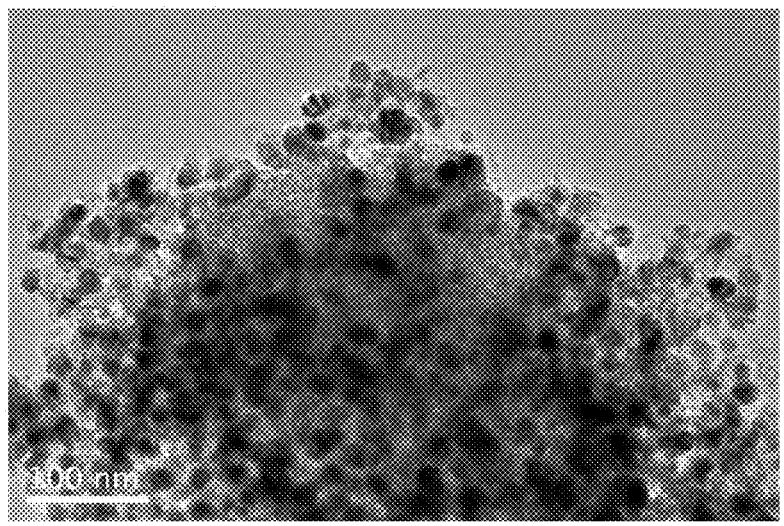
FIG. 6 illustrates a TEM image of an alumina-supported metal Ni obtained in Embodiment 2.

FIG. 2 shows an XRD pattern of an alumina-supported metal Ni. FIG. 6 shows a TEM image of the alumina-supported metal Ni. The TEM image proves that the particle size of the nano Ni consistent with the XRD result.

Embodiment 3

Lanthanum Oxide-Supported Nano NiO

Raw materials for synthesis include: glucose, urea, lanthanum nitrate, water, and $Ni(NO_3)_2 \cdot 6H_2O$ (nickel nitrate).

The preparation process may include the following exemplary steps.

(1) 1.5 g of glucose, 2.5 g of urea, 0.42 g of lanthanum nitrate, 5 g of water, and 0.2 g of $Ni(NO_3)_2 \cdot 6H_2O$ may be weighted and placed in a 100 mL beaker, and then ultrasonic stirring may be performed for 10 minutes such that the chemicals in the beaker are dissolved.

(2) The liquid solution described in (1) may be taken out and heated in microwave with a heating power of 700 W. A dark brown bulky solid may be obtained after 5 minutes of heating.

(3) The sample obtained in (2) may be ground in a mortar and placed in a crucible. After baking in air at 500° C. for 5 hours, a lanthanum oxide-supported nano nickel-oxide may be obtained.

Figure 3:
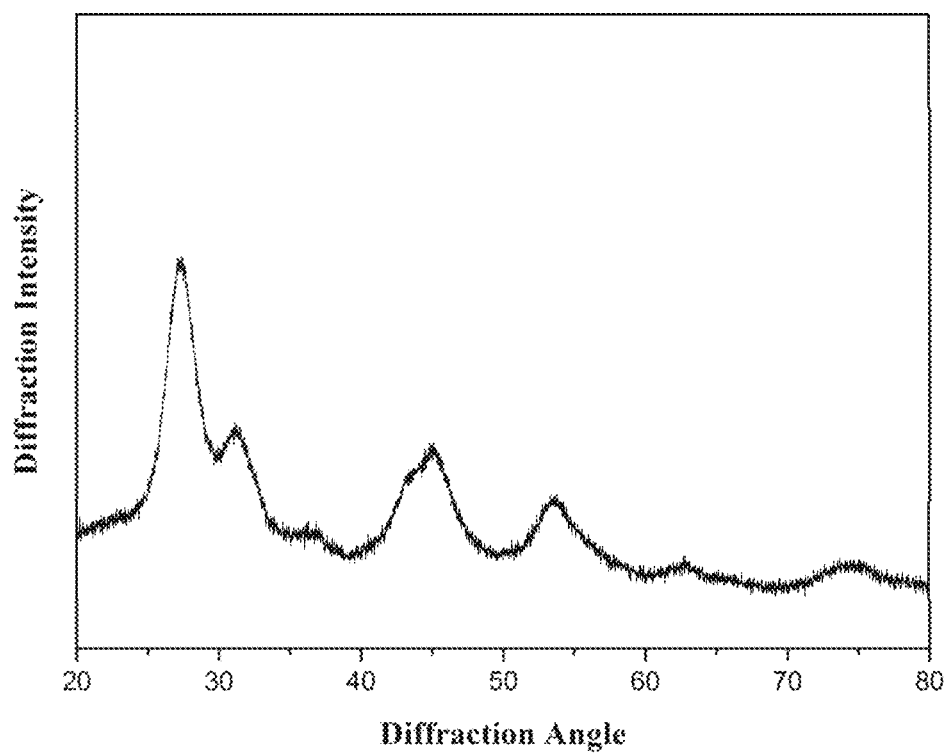
FIG. 3 illustrates an XRD pattern of a lanthanum oxide-supported metal-oxide NiO obtained in Embodiment 3.

FIG. 3 shows an XRD pattern of a lanthanum oxide-supported metal-oxide NiO.

Embodiment 4

Cerium Oxide-Supported Nano NiO

Raw materials for synthesis include: glucose, urea, cerium nitrate, water, and $Ni(NO_3)_2 \cdot 6H_2O$ (nickel nitrate).

The preparation process may include the following exemplary steps.

(1) 1.5 g of glucose, 2.5 g of urea, 0.42 g of cerium nitrate, 5 g of water, and 0.2 g of $Ni(NO_3)_2 \cdot 6H_2O$ may be weighted and placed in a 100 mL beaker, and then ultrasonic stirring may be performed for 10 minutes such that the chemicals in the beaker are dissolved.

(2) The liquid solution described in (1) may be taken out and heated in microwave with a heating power of 700 W. A dark brown bulky solid may be obtained after 5 minutes of heating.

(3) The sample obtained in (2) may be ground in a mortar and placed in a crucible. After baking in air at 500° C. for 5 hours, a cerium oxide-supported nano nickel-oxide may be obtained.

Figure 4:
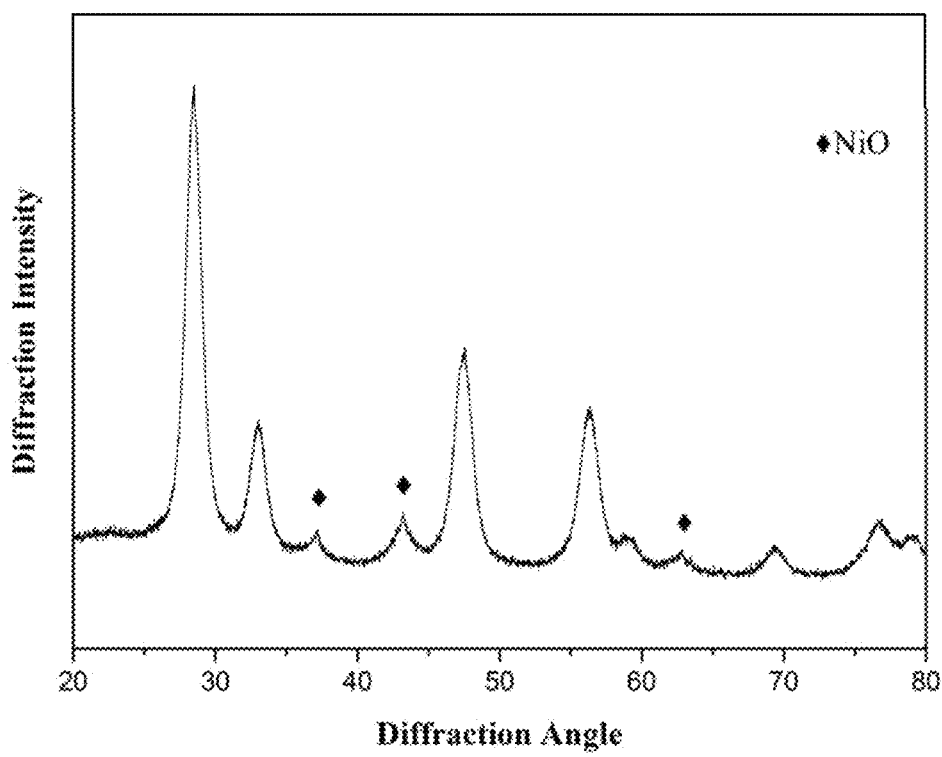
FIG. 4 illustrates an XRD pattern of a cerium oxide-supported metal-oxide NiO obtained in Embodiment 4.

FIG. 4 shows an XRD pattern of a cerium oxide-supported metal-oxide NiO.

Embodiment 5

Silicon Oxide-Supported Nano Ag

Raw materials for synthesis include: fructose, urea, and $Ag(NO_3)_2$ (silver nitrate).

The preparation process may include the following exemplary steps.

(1) 1 g of fructose, 60 g of urea, 0.1 g of Ag(NO$_3$)$_2$, 5 g of water, and 2 g of silica sol may be weighted and placed in a 200 mL beaker, and then ultrasonic stirring may be performed for 10 minutes such that the chemicals in the beaker are dissolved.

(2) The liquid solution described in (1) may be taken out and heated in microwave with a heating power of 500 W. A dark brown bulky solid may be obtained after 3 minutes of heating.

(3) The sample obtained in (2) may be ground in a mortar and placed in a crucible. After baking in air at 500° C. for 5 hours, a silicon oxide-supported nano silver may be obtained.

Embodiment 6

Alumina-Supported Nano Pd

Raw materials for synthesis include: glucose, urea, and Pd(NO$_3$)$_2$.2H$_2$O (palladium nitrate).

The preparation process may include the following exemplary steps.

(1) 50 g of glucose, 2.5 g of urea, 1 g of water, 0.5 g of aluminum sol, and 0.03 g of Pd(NO$_3$)$_2$.2H$_2$O may be weighted and placed in a 200 mL beaker, and then ultrasonic stirring may be performed for 10 minutes such that the chemicals in the beaker are dissolved.

(2) The liquid solution described in (1) may be taken out and heated in microwave with a heating power of 200 W. A dark brown bulky solid may be obtained after 60 minutes of heating.

(3) The sample obtained in (2) may be ground in a mortar and placed in a crucible. After baking in air at 500° C. for 5 hours, an alumina-supported nano palladium-oxide may be obtained.

(4) The alumina-supported nano palladium-oxide may be subjected to heat treatment at 300° C. and under a 5% H$_2$/N$_2$ condition (e.g., a reduction gas containing 5% H$_2$ and 95% N$_2$) for 4 hours to obtain an alumina-supported nano palladium.

Embodiment 7

Silicon Oxide-Supported Nano Fe$_2$O$_3$

Raw materials for synthesis include: lactose, urea, and Fe(NO$_3$)$_2$.9H$_2$O (ferric nitrate).

The preparation process may include the following exemplary steps.

(1) 50 g of lactose, 5 g of urea, 5 g of water, 2 g of silica sol, and 0.5 g of Fe(NO$_3$)$_2$.9H$_2$O may be weighted and placed in a 200 mL beaker, and then ultrasonic stirring may be performed for 10 minutes such that the chemicals in the beaker are dissolved.

(2) The liquid solution described in (1) may be taken out and heated in microwave with a heating power of 50 kW. A dark brown bulky solid may be obtained after 0.1 minute of heating.

(3) The sample obtained in (2) may be ground in a mortar and placed in a crucible. After baking in air at 600° C. for 5 hours, a silicon oxide-supported nano ferric oxide may be obtained.

Embodiment 8

Silicon Oxide-Supported Nano CuO

Raw materials for synthesis include: fructose, urea, and Cu(NO$_3$)$_2$.

The preparation process may include the following exemplary steps.

(1) 1 g of fructose, 60 g of urea, 10 g of Cu(NO$_3$)$_2$, 50 g of water, and 50 g of silica sol may be weighted and placed in a 200 mL beaker, and then ultrasonic stirring may be performed for 10 minutes such that the chemicals in the beaker are dissolved.

(2) The liquid solution described in (1) may be taken out and heated in microwave with a heating power of 500 W. A dark brown bulky solid may be obtained after 30 minutes of heating.

(3) The sample obtained in (2) may be ground in a mortar and placed in a crucible. After baking in air at 500° C. for 12 hours, a silicon oxide-supported nano CuO may be obtained.

According to the present disclosure, a carbohydrate, urea, a precursor of an oxide support together with a metal salt are used to form a homogeneous water solution such that the metal salt is uniformly distributed in the liquid mixture (e.g. solution). Then, through in-situ synthesis, the carbohydrate is dehydrated and carbonized at high temperature, and the metal components are uniformly distributed in the carbon template. Finally, a nano metal or a nano metal-oxide supported by an oxide support is obtained through high-temperature heat treatment. The disclosed method can be used for supporting various nano metal materials. With a particle size in a range of approximately 2 nm to 1000 nm, the nano metal materials demonstrate high monodispersity. By adjusting the synthesis conditions, the composition, the crystal phase, and the supporting capacity of the nano metal can be controlled. In addition, the pore size of the support can also be controlled by raw material ratio, microwave heating power, time, etc., and the distribution of the pore size is a range of approximately 0.1 nm to 10 μm. Moreover, the disclosed method demonstrates various advantages including simple synthesis route, low cost, etc., and thus has broad application prospects in many fields, such as industrial catalysis, water treatment, electrochemistry, etc.

The above are only the preferred embodiments of the present disclosure, and are not intended to limit the present disclosure. Any modifications, equivalents, improvements, etc., that are within the spirit and scope of the present disclosure, shall be included in the scope of protection of the present disclosure.

What is claimed is:

1. A microwave-assisted carbon template method for preparing supported nano metal-oxides or nano metals, comprising:
   a) mixing a carbohydrate, urea, and a precursor of an oxide support together with a metal salt in a container, adding a certain amount of water, and completely dissolving solid chemicals in water through ultrasonic stirring to form a homogeneous solution;
   b) performing microwave treatment on the solution obtained in a) for approximately 0.1 minute to 60 minutes with a microwave heating power in a range of approximately 100 W to 50 kW, such that the carbohydrate is dehydrated and carbonized and a solid is formed; and
   c) performing heat treatment on the solid obtained in b) at a temperature in a range of approximately 200° C. to 1100° C. in an air atmosphere for approximately 0.5 hour to 24 hours to obtain a metal-oxide supported by a porous oxide support.

2. The method according to claim 1, after performing heat treatment on the solid to obtain the porous oxide supported metal-oxide, further including:

d) heat treating the metal-oxide supported by the porous oxide support obtained in c) at a temperature in a range of approximately 200° C. to 1100° C. in a reducing atmosphere for approximately 0.5 hour to 24 hours to obtain a nano metal supported by a porous oxide support.

3. The method according to claim 2, wherein:
a reducing gas used in d) is a mixed gas containing hydrogen or carbon monoxide in a volume fraction of approximately 5% to 10%, and nitrogen or argon as an equilibrium gas.

4. The method according to claim 2, wherein:
the porous oxide support obtained in d) is a single element oxide or a composite oxide, wherein:
the single element oxide is an oxide of Si, Mg, Al, Pb, In, Sn, Sb, Zr, Nb, Ce, Ta, Mo, W, Re, Ti, V, Cr, Mn, Fe, Co, Ni, Cu, Zn, Ag, Pt, Pd, Ir, Ru, Rh, Y, Ba, Sr, La or Os; and
the composite oxide includes oxides of two or more different elements of Si, Mg, Al, Pb, In, Sn, Sb, Zr, Nb, Ce, Ta, Mo, W, Re, Ti, V, Cr, Mn, Fe, Co, Ni, Cu, Zn, Ag, Pt, Pd, Ir, Ru, Rh, Y, Ba, Sr, La and Os.

5. The method according to claim 2, wherein:
the nano metal supported by the porous oxide support obtained in d) is an elementary metal of Mg, Al, Sc, Ti, V, Cr, Mn, Fe, Co, Ni, Cu, Zn, Pt, Pd, Ru, Os, Rh, Ir, Au, Ag, Pb, In, Sn, Sb, Zr, Nb, La, Ce, Ta, Mo W, or Re; or an alloy or an intermetallic compound of two or more different metal elements of Mg, Al, Sc, Ti, V, Cr, Mn, Fe, Co, Ni, Cu, Zn, Pt, Pd, Ru, Os, Rh, Ir, Au, Ag, Pb, In, Sn, Sb, Zr, Nb, La, Ce, Ta, Mo, W, and Re.

6. The method according to claim 1, wherein:
the precursor of the oxide support used in a) includes a common silicon source, a common aluminum source, or other common metal salt, wherein:
the common silicon source includes at least one of silica sol, sodium silicate, and tetraethyl orthosilicate;
the common aluminum source includes at least one of aluminum sol, aluminum sulfate, aluminum chloride, aluminum nitrate, and aluminum isopropoxide; and
the other common metal salt is a nitrate, halide, hypochlorite, acetate, oxalate, phosphate, or sulfate of a metal element, or includes more than one salt of different metal elements, wherein:
the metal elements include Mg, Pb, In, Sn, Sb, Zr, Nb, Ce, Ta, Mo, W, Re, Ti, V, Cr, Mn, Fe, Co, Ni, Cu, Zn, Ag, Pt, Pd, Ir, Ru, Rh, Y, Ba, Sr, La, and Os.

7. The method according to claim 1, wherein:
the metal salt used in a) is a nitrate, halide, hypochlorite, acetate, oxalate, phosphate, or sulfate of a metal element, or includes more than one salt of different metal elements, wherein:
the metal elements include Mg, Al, Pb, In, Sn, Sb, Zr, Nb, Ce, Ta, Mo, W, Re, Ti, V, Cr, Mn, Fe, Co, Ni, Cu, Zn, Ag, Pt, Pd, Ir, Ru, Rh, Y, Ba, Sr, La, and Os.

8. The method according to claim 1, wherein:
the carbohydrate used in a) is one of glucose, fructose, sucrose, maltose, lactose, starch, methylcellulose, and dextrin.

9. The method according to claim 1, wherein:
a mass ratio of the carbohydrate to urea in a) is approximately 20:1 to 1:60;
a mass ratio of the carbohydrate to the metal salt in a) is approximately 100:1 to 1:10;
a mass ratio of the carbohydrate to the precursor of the oxide support in a) is approximately 100:1 to 1:50; and
a mass ratio of the carbohydrate to water in a) is approximately 50:1 to 1:100.

10. The method according to claim 1, wherein:
the porous oxide support obtained in c) is a single element oxide or a composite oxide, wherein
the single element oxide is an oxide of Si, Mg, Al, Pb, In, Sn, Sb, Zr, Nb, Ce, Ta, Mo, W, Re, Ti, V, Cr, Mn, Fe, Co, Ni, Cu, Zn, Ag, Pt, Pd, Ir, Ru, Rh, Y, Ba, Sr, La, or Os; and
the composite oxide includes oxides of two or more different elements of Si, Mg, Al, Pb, In, Sn, Sb, Zr, Nb, Ce, Ta, Mo, W, Re, Ti, V, Cr, Mn, Fe, Co, Ni, Cu, Zn, Ag, Pt, Pd, Ir, Ru, Rh, Y, Ba, Sr, La, and Os.

11. The method according to claim 1, wherein:
the metal-oxide supported by the porous oxide support obtained in c) is a single metal element oxide or a composite metal-oxide, wherein:
the single metal-oxide is an oxide of Mg, Al, Pb, In, Sn, Sb, Zr, Nb, Ce, Ta, Mo, W, Re, Ti, V, Cr, Mn, Fe, Co, Ni, Cu, Zn, Ag, Pt, Pd, Ir, Ru, Rh, Y, Ba, Sr, La or Os; and
the composite metal-oxide includes oxides of two or more different metal elements of Mg, Al, Pb, In, Sn, Sb, Zr, Nb, Ce, Ta, Mo, W, Re, Ti, V, Cr, Mn, Fe, Co, Ni, Cu, Zn, Ag, Pt, Pd, Ir, Ru, Rh, Y, Ba, Sr, La and Os.

* * * * *